UNITED STATES PATENT OFFICE.

KARL A. HOHENSTEIN, OF BROOKLYN, NEW YORK.

FIRE-PROOF COMPOUND.

SPECIFICATION forming part of Letters Patent No. 289,262, dated November 27, 1883.

Application filed July 12, 1883. (No specimens.)

*To all whom it may concern:*

Be it known that I, KARL A. HOHENSTEIN, a citizen of the United States, residing at Brooklyn, in the county of Kings and State of New York, have invented new and useful Improvements in Fire-Proof Compounds, of which the following is a specification.

This invention is a fire-proof compound consisting of silicate of soda, milk, and chalk, these ingredients being combined in about the following proportions, viz: silicate of soda, one gallon; milk, three gallons; chalk, three pounds. When the ingredients named have been thoroughly mixed, the compound is applied to the selected surface in form of a coat, as by a brush, and by its means such surface is thoroughly protected against fire.

My compound can be used to great advantage for coating the inner surfaces of fermenting-tuns, in place of the varnish or pitch usually employed, and other wooden surfaces, as well as iron and other hard surfaces, and, if desired, a light coat of chloride of calcium may be applied after the previous coat has dried, to produce a vitreous surface. The milk used may be either sweet or sour, and instead of chalk I may use china-clay, while the whole may, if desired, be colored with a suitable pigment.

I am aware that in making paint it has been proposed to use skimmed milk, newly-slaked lime, an oil, Spanish white, and a coloring substance or pigment, and such, therefore, I do not wish to be understood as claiming; but

What I claim as new, and desire to secure by Letters Patent, is—

The within-described fire-proof compound, consisting of silicate of soda, milk, and chalk, mixed together in about the proportions set forth.

In testimony whereof I have hereunto set my hand in the presence of two subscribing witnesses.

KARL A. HOHENSTEIN.

Witnesses:
W. HAUFF,
EDWARD BILL.